3,738,887
METHOD OF SEAMLESS CONNECTION OF LEATHER- AND/OR SYNTHETIC LEATHER-PARTS, OR THE LIKE, MATERIAL AND APPARATUS FOR PERFORMING THE METHOD
Richard Hoffmann, Stetten, near Hechingen, Germany, assignor to Firma Bima Maschinenfabrik GmbH, Hechingen, Hohenzollern, Germany
Filed Mar. 17, 1971, Ser. No. 125,060
Claims priority, application Germany, Mar. 21, 1970, P 20 13 675.8
Int. Cl. B29c 19/02; B30b 15/34
U.S. Cl. 156—380
6 Claims

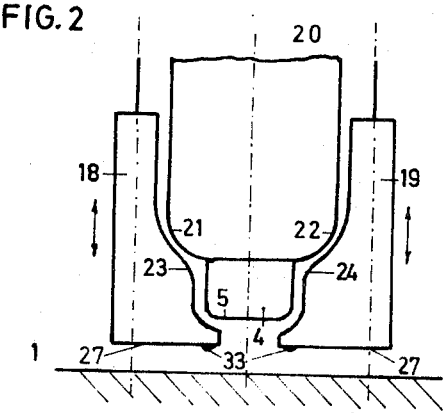
FIG. 2
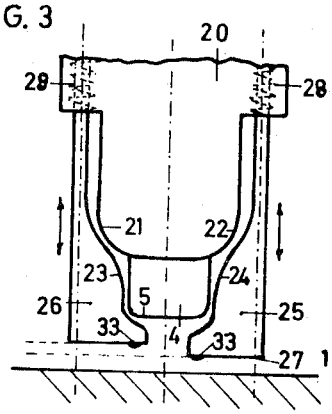
FIG. 3
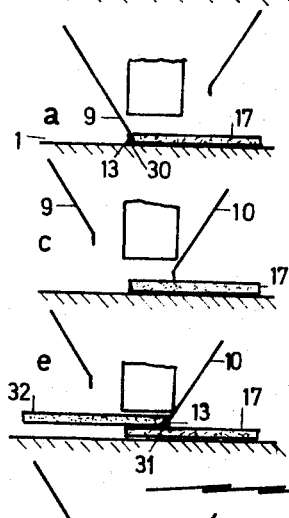
FIG. 4
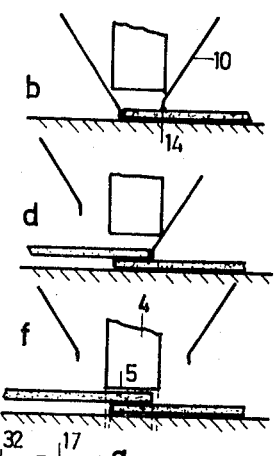
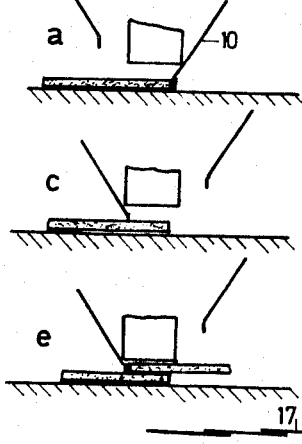
FIG. 5
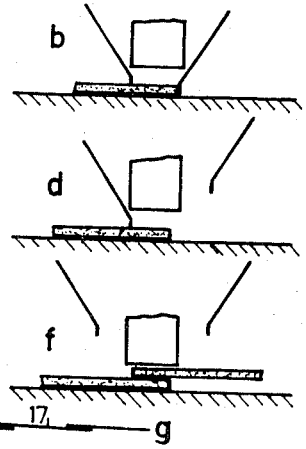

ABSTRACT OF THE DISCLOSURE

A method of and apparatus for seamless connection of leather- and/or synthetic leather-parts, or the like working material with one of its face parts provided with a glue material layer between the parts, which glue material layer can be activated and the two parts adhering together by a pressure effect which comprises the steps of lowering the face parts to be connected together in a width below an electrode with a glue material layer disposed therebetween, the width being less than the width of the bottom face of the electrode. The electrode is lowered onto the face parts with overlapping the bottom face of the electrode over the face parts, heating the superposed face parts for activating the glue material layer by the electrode sitting thereon, and the face parts are pressed together by the electrode for adhering together of the face parts.

---

The present invention relates to a method of seamless connection of leather- and/or synthetic leather-parts or the like material, with one of its face parts, preferably its edge-strips and ranges, respectively, by means of a glue material layer provided between the edge strips or layers, which glue material layer may be activated by heat and adhered together two parts by a pressure effect, whereby the heat- and pressure-effect is obtained by means of a heatable press stamp, by example, by an electrode heatable by high frequency, as well as to an apparatus for performing this method.

It is known to connect seamless leather- and/or synthetic leather-parts or the like material of the above-stated type. Suitably one avails itself for that reason of an apparatus with a down holder device, which serves simultaneously also as a limiting abutment for the edge of a work piece part and at least one electrode moveable relative to the latter. The down holder holds thereby rigidly the work material part disposed plane on a working table and is for the other work piece part disposed on the top of the first one to be connected with the latter, simultaneously a limiting abutment, which limiting abutment marks the one electrode outer edge pointing towards the down holder. Accordingly, the two side faces pointing towards each other and the lower side edges of the electrode, respectively, and of the down holder substantially of a complementary structure. For the seamless connection, without forming a bead at the overlapping edges of the two work piece parts disposed on top of each other with their edge strips and their edge range, respectively, the electrode must be moved such on the work pieces parts up to their engagement such, that the following pressing together of the edge ranges, the one lower side edge of the electrode can follow as much as possible without a split to that of the down holder.

It has been shown now, that already upon a small slight split-formation between these two lower side edges during the heat pressure of the work piece parts by the electrode from the upper edge of the margin of the one work piece part engaging a down holder a bead is pressed out and in the split formed by the electrode- and down holder-lower-edge is pressed in. This bead brings about work pieces, which, if used in the shoe production industry, are often non-usable. Furthermore, this known apparatus is for this reason of a disadvantage and, that for the connection at the same position and symmetrical position, respectively, of another work piece part to another part already connected, the parts must be rotated for 180° in their engagement place. This is particularly difficult in case of a plurality of work piece parts joined to one face and hinders the flowing working rhythm.

It is one object of the present invention, to provide a method of and an apparatus for seamless connection of leather bags and/or synthetic leather parts or the like material, wherein the above-stated disadvantages are avoided, so that on the one hand upon seamless connection of work piece parts of leather and the like no bead can be created anymore at the margin of the connecting edges and, on the other hand, any number of work piece parts of any kind can be connected together without rotation at first any part for 180°.

It is another object of the present invention, to provide a method of and an apparatus for seamless connection of leather- and/or synthetic leather-parts or the like material, wherein the face parts to be connected are disposed on top of each other in a width below the electrode with an intermediately disposed glue material layer, which width is smaller than the width of the bottom face of the electrode, that the electrode is lowered to the face parts held in their position and disposed on top of each other with an over reach from both sides of the bottom face of the electrode over these face parts and the face parts disposed on top of each other are heated for the activation of the glue material by the electrode sitting thereon and are pressed together for adhering to each other.

Suitably however, from both face parts disposed on top of each other below the electrode of the working materials to be connected, one abuts with its side edge on an abutment below the electrode within its bottom face and by means of another holding abutment serving simultaneously as down holder and as abutment below the electrode, likewise within its bottom face, is held down on the working table and the other working material part to be connected engages with its side edge the holding abutment serving now as abutment.

The apparatus for performing the method is particularly characterized by a working table and an electrode disposed thereabove and moveable towards the latter and by at least one holding abutment, disposed on one side of this electrode and moveable relatively thereto, which holding abutment is movable with a holding- and abutment-face in the starting position of the electrode below the bottom face moveable towards the working table and mountable thereon.

With these and other objects in view, which will become apparent in the following detailed description, the present invention will be clearly understood in connection with the accompanying drawings, in which:

FIG. 2 is a schematic elevation of the mounting of the holding abutments on an electrode block;

FIG. 3 is an apparatus with a single holding abutment only; and

Figure 1:
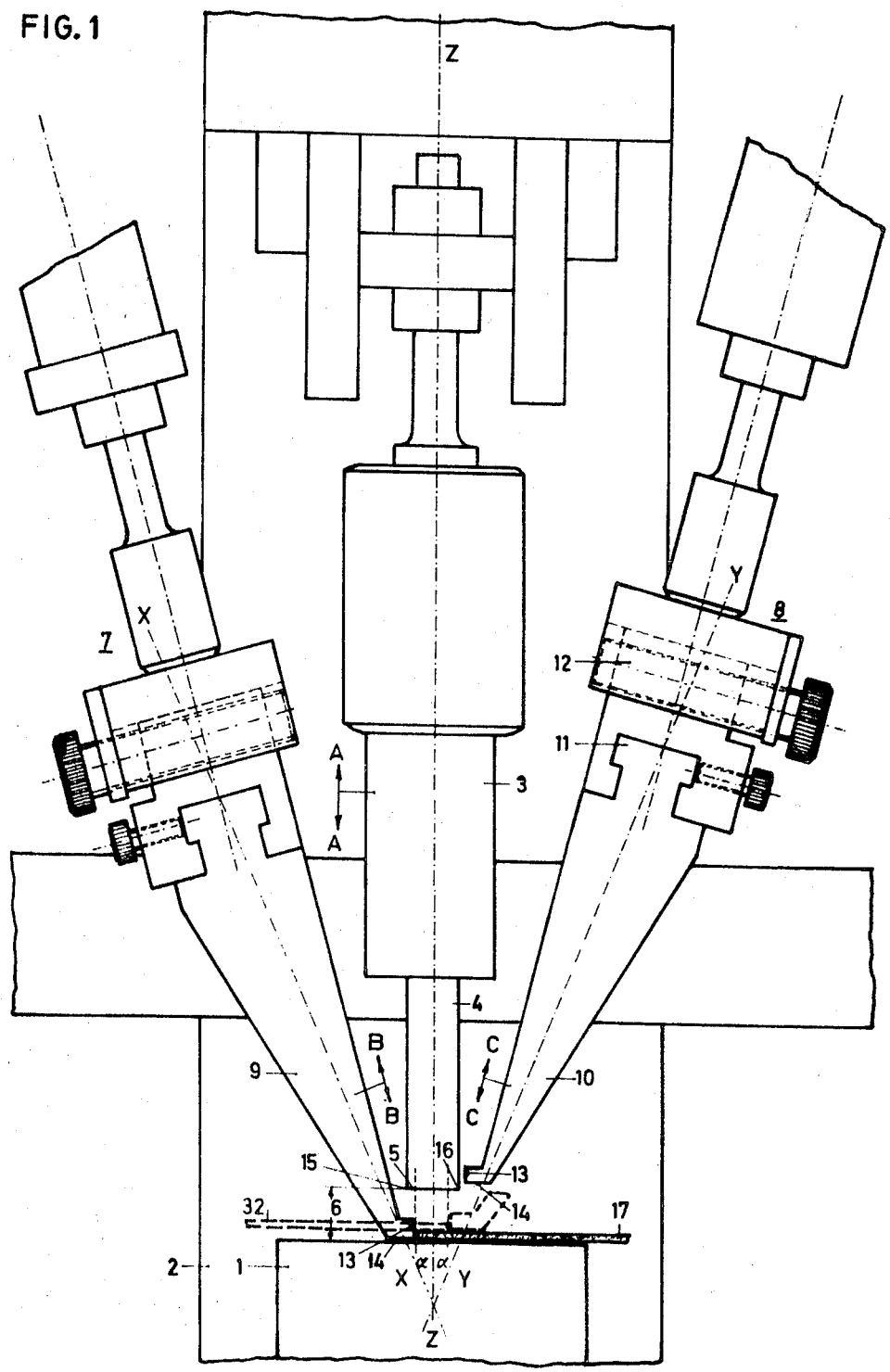
FIG. 1 is a front elevation of the essential parts of the apparatus.

FIGS. 4a, b, c, d, e, f, g, and FIGS. 5a, b, c, d, e, f, g are schematic showings of the individual function successions of the holding abutments upon insertion of the work piece parts and the continuous seamless connection, respectively, of any number of work piece parts from the same direction for insertion of the individual work piece part.

Referring now to the drawings, and in particular to FIG. 1, the apparatus designed in accordance with the present invention comprises a working table 1, which is secured at the front side to a frame structure 2. An electrode 3 is releasably secured above the working table 1 in an electrode block 4, which electrode 4 rests in its starting position with its bottom face 5 at a distance 6 above the working table 1. The electrode is moveable by means of its electrode block 3 in the direction of the arrows A—A to the top surface of the work piece and back again from the latter into its starting position. Holding abutments 9 and 10 are displaceable in each direction in holding members 7 and 8 in the plane of the suspension by means of dove-tail guides of which only one dove-tail guide 11 and 12 of the holding abutment 10 is shown. The holding abutments 9 and 10 are displaceable relative to the electrode 4 in the arrow directions B—B and C—C, respectively, and stand thus obliquely to the electrode symmetrically opposite each other, so that their axes x—x and y—y form an angle α to the electrode axis z—z. The lower free ends of the holding abutments have an abutment face 13 extending substantially parallel in the working position with the electrode axis z—z and have a lower holding face 14 disposed parallel with the surface of the working table. The holding abutments 9 and 10 are resiliently displaceably mounted in their holding members towards the electrode, so that they can be pressed away by the outer electrode side edges 15 and 16, respectively, over the abutment faces 13 against a spring force from the electrode slightly outwardly, under circumstances. The angle α determines thereby the oblique position of the holding abutments relative to the electrode and must be dimensioned such, that the abutment faces 13 of the holding abutments in working position, that means, when the holding abutments stand on the working table or on the working material part with their holding face, the electrode undergrips and is disposed within the bottom face 5 of the latter. This is particularly clearly visible in FIG. 1, where the holding abutment 10 rests in operative position with its lower part at the level of the bottom face of the electrode and where the working position this bottom part (shown in dotted lines), stands up below the electrode bottom face with its holding face on a work piece part 17.

In accordance with another embodiment, holding abutments 18 and 19 are displaceably mounted in a block designed therefor, and an electrode holding block 20, respectively, relative to the electrode 4 held with the latter.

The electrode holding block is thereby rounded up on both of its sides 21 and 22, which are disposed opposite the holding abutments 18 and 19. In the same manner also the inner side faces 23 and 24 of these holding abutments are rounded concavely. Upon movement of the electrode holding block towards the working table 1, the holding abutments 18 and 19 are pushed from each other by the rounded sides 21 and 22 of the electrode holding block 20, slowly coming into engagement with the sides 21 and 22, so that the electrode 4 can grip through the work pieces disposed therebelow without engagement of the holding abutments. In the present case the holding abutments 18 and 19 undergrip the electrode 4 and its bottom face 5, respectively, already in the starting position. The holding abutments 18 and 19 are thereby likewise as the holding abutments 9 and 10 in accordance with the arrangement of FIG. 1 separately moveable on the work piece table back and forth from the latter.

Referring now to FIG. 3 an apparatus is disclosed finally with only one holding abutment 25, while opposite the latter only one holding foot 26 is arranged. The holding abutment and the holding foot are thereby mounted in the electrode holding block 20 spring tensioned towards the working table 1. The bottom face 27 of the holding abutment is thereby closer to the surface of the working table 1 than the bottom face of the holding foot. Both parts, the holding abutment 25 and the holding foot 26, are in the holding electrode block 20 parallel to the axis of the latter as well as relative to each other displaceably mounted against the spring force of their pretensioning cylindrical springs 28 and 29, however, moveable relative to the working table, as well as only with the electrode holding block 20. In addition the electrode holding block has on its outer sides 21 and 22 and the holding abutment 25 as well as the holding foot 26 in the inner side roundings, which serve the same purpose as that in the apparatus shown in FIG. 2. The holding abutment 25 holds thereby upon lowering of the electrode holding block 20 onto the working table a work piece disposed therebelow independent upon the spring pressure of the cylindrical spring 28. A further work piece abutted thereto with the work piece to be connected and disposed therebelow is then returned upon further lowering of the electrode holding block 20 finally by the holding foot now by the spring force of the cylindrical spring 29. If the electrode holding block moves now further towards the work pieces disposed below the electrode bottom face 5, which are not shown in the drawing, the holding abutment 25 and the holding foot 26 are in cooperation with the roundings 21, 22 and as well as 23 and 24 pressed away from each other and the electrode 4 can break through without interference to the work pieces to be connected together and both on top of each other.

This arrangement is preferably used always, where the work pieces are to be joined to a single unit from one side. It should be emphasized here that the holding abutment 25 can be disposed either on the right side or on the left electrode side by the operator of the apparatus.

Referring now again to the drawings and particularly to FIGS. 4a to 4g, and 5a to 5g, respectively, the position of the individual holding abutments is disclosed, which is required for feeding any number of workpiece parts into the apparatus by a feeding device for continuous seamless connection of the individual workpieces. Prior to the deposition of the workpiece 17 on the working table 1, the holding abutment 9 is lowered onto the working table 1 and forms with its engagement face 13 the abutment for the side edge 30 of the workpiece 17 (FIG. 4a). The holding abutment 10 is lowered onto the workpiece 17 and stands with its holding face 14 on its surface (FIG. 4b). The holding abutment 9 returns again into the starting position and the workpiece 17 is retained by the holding abutment 10 on the working table 1 and forms such a limiting abutment for the side edge 31 of the other workpiece 32 with the workpiece 17 to be connected with the first workpiece (FIG. 4c). This workpiece 32 engages with its side edge 31 the abutment side 13 of the holding abutment 10, so that now both workpieces 17 and 32 are disposed on top of each other below the electrode 4 such that its bottom face 5 overlays both side edges 30 and 31 (FIG. 4d). In this position of the workpiece, the electrode 4 is lowered onto the workpieces 17 (FIG. 4e) and upon engagement of the workpiece, the holding abutment 10 returns into its starting position, in which it switches on the energy source for instance, AF, generator (FIG. 4f) required for the press welding of the two workpieces. In such working succession of the individual holding abutments in case of a continuous feeding of the workpieces to continuously arriving from above can be created from one side of the welding connection, as it is shown finally in FIG. 4g, that means that on the edge parts of the workpiece 17 always the edge parts of the workpiece 32 are superposed.

If now on the other hand the workpieces 17 are connected together deposited on the workpieces 32 with their edge parts, the switching succession for the holding abutments must take place in reversed order starting with the holding abutments 10 (FIG. 5a). From the connecting member apparent in FIG. 5f it can be seen, that thereby the edge part of the workpieces 17 are always superposed connected on the edge parts of the workpieces 32.

From that it can be deduced that for the selective changing connection as about for the obtaining of working piece connections in which selectivity the edge parts to be connected come to lie on top of or below the other it is no more required to rotate the already connected workpiece parts in their engagement plane 180° rather merely the switching succession of the holding abutments has to be changed or varied accordingly and the parts to be connected are to be added correspondingly.

It is still pointed out that below in the holding abutments 18, 19 and the holding abutment 25 and the holding foot 26, respectively, the bottom faces 27 are thereby overlapping, a roller 33 being rotatably mounted. By such arrangement it should be avoided that during pressing together of the holding abutment and of the holding foot the workpiece part to be connected disposed on the working table are displaced. Suitably for this purpose the surface of the working table is slightly roughened within the range below the electrode.

While I have disclosed several embodiments of the present invention, it is to be understood that these embodiments are given by example only and not in a limiting sense.

I claim:

1. An apparatus for seamless connection of leather- and/or synthetic leather parts or the like material with one of its face parts by means of a glue material layer disposed between said face parts, comprising
a working table,
an electrode having an electrode axis and a bottom face as well as disposed above said table and movable towards and from the latter,
at least one holding abutment disposed on both sides of said electrode and movable relative to the latter,
said holding abutments having a holding- and abutment face, and arranged in the starting position of said electrode below its bottom face in a holding and abutment position of said holding abutments, as well as movable towards and mountable on said table,
a holding member having dove-tail guides in which one of said holding abutments are displaceably mounted relative to said electrode, respectively,
securing screw means for releasably securing said holding abutments in a displaced position in said dove-tail guides,
each of said holding members defining a longitudinal axis pointing toward said working table and being shiftable along said longitudinal axis along with said holding abutments,
said holding abutments on each side of said electrode each having lower free ends facing each other and extending substantially parallel to said electrode axis and each having lower surfaces extending parallel to an upper surface of said working table, and said holding abutments being resiliently shiftably mounted relative to said electrode.

2. The apparatus, as set forth in claim 1, which includes
an electrode holding block securing said electrode and having rounded sides pointing towards said holding abutments.

3. The apparatus, as set forth in claim 2, wherein
said holding abutments have inner sides, pointing towards said rounded sides of said electrode holding block, are concavely rounded.

4. The apparatus, as set forth in claim 3, which includes
rollers disposed on said lower surfaces of said holding abutments, and
said rollers extend beyond said lower surface of said holding abutments.

5. The apparatus, as set forth in claim 1, wherein
said longitudinal axes form an inclined angle with said electrode axis, and said holding abutments are inclined towards said electrode.

6. The apparatus, as set forth in claim 1, wherein,
in said holding and abutment position the distance between said free ends of said holding abutments, respectively, is less than the width of said bottom face of said electrode.

References Cited
UNITED STATES PATENTS 3,172,798  3/1965  Rosenbaum _____ 156—380
2,401,991  6/1946  Walton et al. _____ 156—380

DOUGLAS J. DRUMMOND, Primary Examiner

U.S. Cl. X.R.
156—583